(12) United States Patent
Kumar et al.

(10) Patent No.: US 12,174,705 B2
(45) Date of Patent: Dec. 24, 2024

(54) INTELLIGENT RESTART OR FAILOVER OF A CONTAINER

(71) Applicant: Dell Products L.P., Round Rock, TX (US)

(72) Inventors: Vikas Kumar, Jind (IN); Santhosh Krishnegowda, Bangalore (IN); Tarandeep Singh Gill, Hisar (IN)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/308,110

(22) Filed: Apr. 27, 2023

(65) Prior Publication Data

US 2024/0362119 A1    Oct. 31, 2024

(51) Int. Cl.
*G06F 11/07* (2006.01)
*G06F 11/14* (2006.01)

(52) U.S. Cl.
CPC ........ *G06F 11/1441* (2013.01); *G06F 11/076* (2013.01); *G06F 11/0772* (2013.01)

(58) Field of Classification Search
CPC ............... G06F 11/1441; G06F 11/076; G06F 11/0772; G06F 11/0766; G06F 11/203; G06F 11/1438; G06F 11/1479
See application file for complete search history.

(56) References Cited

U.S. PATENT DOCUMENTS

| 2019/0188094 A1* | 6/2019 | Ramamoorthi | ....... G06F 11/203 |
| 2021/0271560 A1* | 9/2021 | Shankar D H | ....... G06F 11/302 |

FOREIGN PATENT DOCUMENTS

CN            114218050 A   *   3/2022   ............ G06F 11/142

* cited by examiner

*Primary Examiner* — Yolanda L Wilson
(74) *Attorney, Agent, or Firm* — DALY, CROWLEY, MOFFORD & DURKEE, LLP

(57) ABSTRACT

An example methodology includes, by a node of an active-passive high availability (HA) cluster, determining that a container on the node has failed with an error and, responsive to a determination that the error is a new error, creating an error object that represents the error, creating an error object that represents the error and initializing a value of an error_code_value attribute in the error object to an initial_value_to_error_code attribute that indicates an initial value to assign to the error_code_value. The method also includes, by the node, incrementing a failcount attribute that indicates a count of a number of container failures on the node, determining whether to restart or failover the container based on a comparison of the failcount attribute and a failure count threshold, and, responsive to a determination to restart the container, attempting a restart of the container on the node.

20 Claims, 5 Drawing Sheets

Error Object 300

- error_code
- error_code_value
- etc

FIG. 3

Container Failover Policy 400

- initial_value_to_error_code
- failover_threshold
- failcount_threshold
- failcount
    ...

FIG. 4

INTELLIGENT RESTART OR FAILOVER OF A CONTAINER

BACKGROUND

A high availability (HA) cluster is a group of nodes (or "hosts") that operate as a single system and provide continuous availability without failing for a designated period. The nodes may host applications that utilize the services provided by the system, such as the data services provided by storage systems. In containerized environments, applications run in fully packaged, isolated, and portable computing environments, called containers, while using a shared operating system (OS).

In a multi-node active-passive HA cluster environment, one of the nodes may operate as an "active" node and the other nodes may operate as "passive" nodes. If a container fails on the active node, a number of retries are attempted to start the container on the active node before failover to one of the other passive nodes. The failover ensures that the failed container will automatically be restarted on another node.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a node of an active-passive high availability (HA) cluster, determining that a container on the node has failed with an error and, responsive to a determination that the error is a new error, creating an error object that represents the error, wherein the error object comprises an error_code attribute that indicates the error and an error_code_value attribute that indicates a value assigned to the error_code, and initializing the value of the error_code_value attribute to a value of an initial_value_to_error_code attribute, wherein the initial_value_to_error_code attribute indicates an initial value to assign to the error_code_value. The method also includes, by the node, incrementing a failcount attribute that indicates a count of a number of container failures on the node, determining whether to restart or failover the container based on a comparison of the failcount attribute and a failcount_threshold attribute that indicates a failure count threshold for the failcount, and, responsive to a determination to restart the container, attempting a restart of the container on the node.

In some embodiments, the method further includes, responsive to a determination that the restart of the container is successful, rewarding, by the node, the error_code_value attribute.

In some embodiments, the method further includes, responsive to a determination that the restart of the container is not successful, penalizing, by the node, the error_code_value attribute.

In some embodiments, the method further includes, responsive to a determination to failover the container, by the node, penalizing the error_code_value attribute and performing a failover of the container to a passive node of the active-passive HA cluster.

In some embodiments, the determining whether to restart or failover the container is further based on a comparison of the error_code_value attribute and a failover_threshold attribute, wherein the failover_threshold attribute indicates a failover decider threshold for the error_code_value.

In some embodiments, the comparison of the error_code_value attribute and the failover_threshold attribute is performed before the comparison of the failcount attribute and the failcount_threshold attribute.

In some embodiments, the determining whether to restart or failover the container is further based on a check of an epsilon-greedy condition. In one aspect, the method further includes, responsive to a determination that the epsilon-greedy condition is satisfied, attempting, by the node, a restart of the container on the node based on the comparison of the failcount attribute and the failcount_threshold attribute. In another aspect, the method further includes, responsive to a determination that the epsilon-greedy condition is not satisfied, performing, by the node, a failover of the container to a passive node of the active-passive HA cluster based on a comparison of the error_code_value attribute and a failover_threshold attribute, wherein the failover_threshold attribute indicates a failover decider threshold for the error_code_value.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3 shows an example error object, in accordance with an embodiment of the present disclosure.

FIG. 4 shows several attributes of an example container failover policy, in accordance with an embodiment of the present disclosure.

DETAILED DESCRIPTION

Containers are associated with container start timeouts. A container start timeout value for a container is set to a duration (seconds) which is sufficient for a healthy start of the container. A container is also associated with a limit on the number of times a restart of the container is to be attempted if the container exits due to an error (e.g., if the container fails). As a result, when a container fails on a node, restarts of the failed container on the same node are attempted up to the maximum retry limit without consideration to the cause of the failure. For example, restarts of the failed container are attempted up to the maximum limit on the number of retries even in cases where the failure of the container is caused by a problem/issue which is unresolvable in the time between the retries, such as, for example, a hardware problem or issue. The failover of the failed container is performed only upon exhausting all its retries. Naively attempting restarts of a failed container in this manner results in unnecessary downtime for a containerized application as well as inefficient use/wastage of computing resources.

Disclosed herein are concepts, structures, and techniques for intelligent restart of a container on a node or failover of the container to a secondary passive node in an active-passive HA cluster environment. Such intelligence can be achieved by error-based prediction to restart or failover the container. In some embodiments, a reinforcement learning (RL)-based model is utilized to intelligently determine (or "decide") whether to restart or failover a container (i.e., restart or failover a failed container). RL is a type of machine learning technique that enables an agent to learn from its environment (e.g., the environment in which the agent operates) by trial and error using feedback from its own actions and experiences. RL uses rewards and penalties (or "punishments") as feedback signals for positive and negative behavior. In some embodiments, for a particular error associated with a container failure, the agent is given a reward for each successful restart of the container and a penalty for each unsuccessful restart of the container for that error. Upon a failure of a container with a particular error, the agent can determine whether to restart or failover the container based on its learning. In some embodiments, the agent may also apply epsilon-greedy logic for random exploration and exploitation.

These and other embodiments disclosed herein overcome the problems that can otherwise result when containers are naively restarted on the same node. For example, illustrative embodiments can intelligently restart or failover a container using an RL based model, thereby significantly reducing unnecessary downtime for containerized applications, and providing significant performance enhancements. Numerous configurations and variations will be apparent in light of this disclosure.

Figure 1:
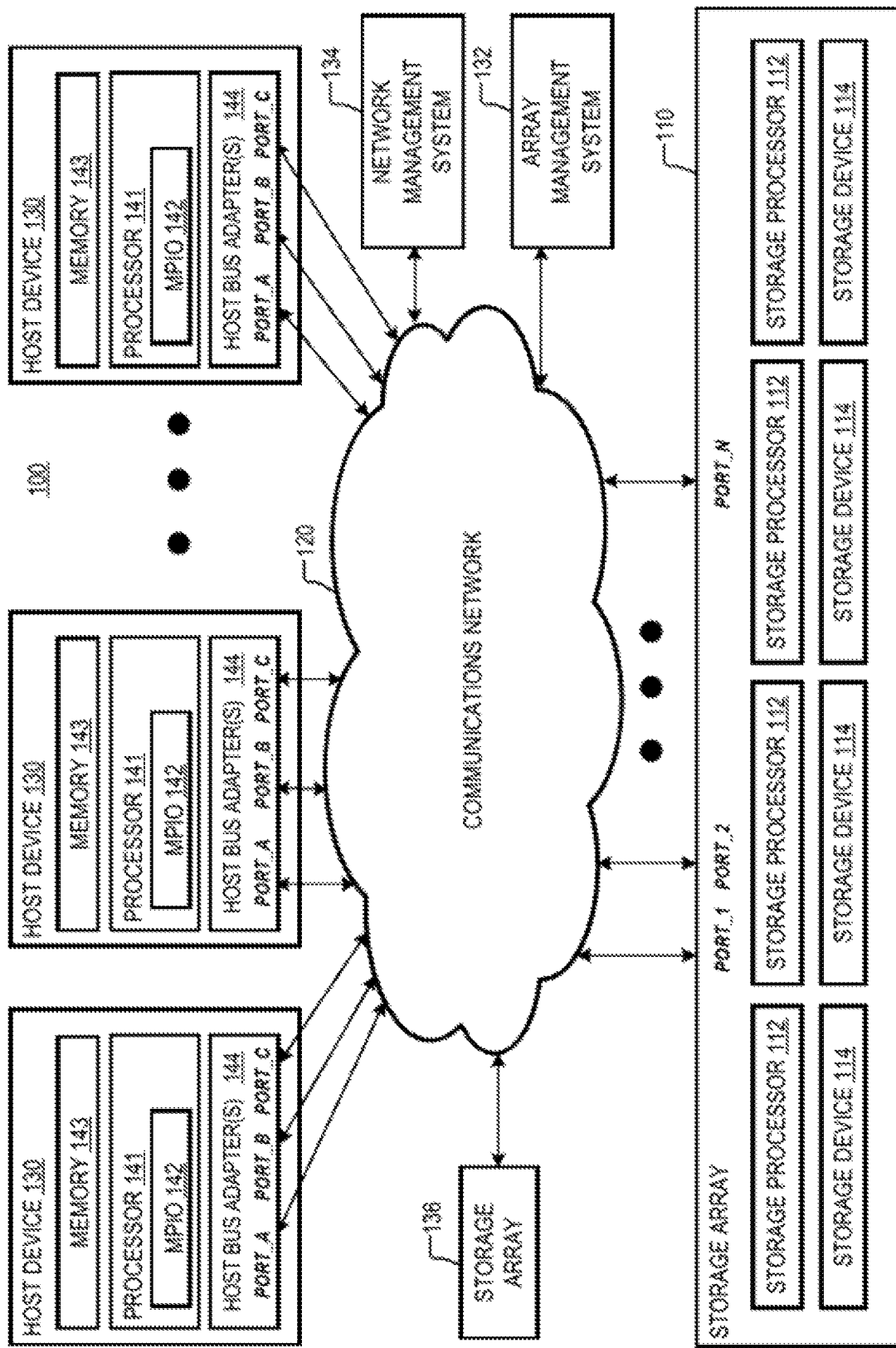
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 600 of FIG. 6. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 6:
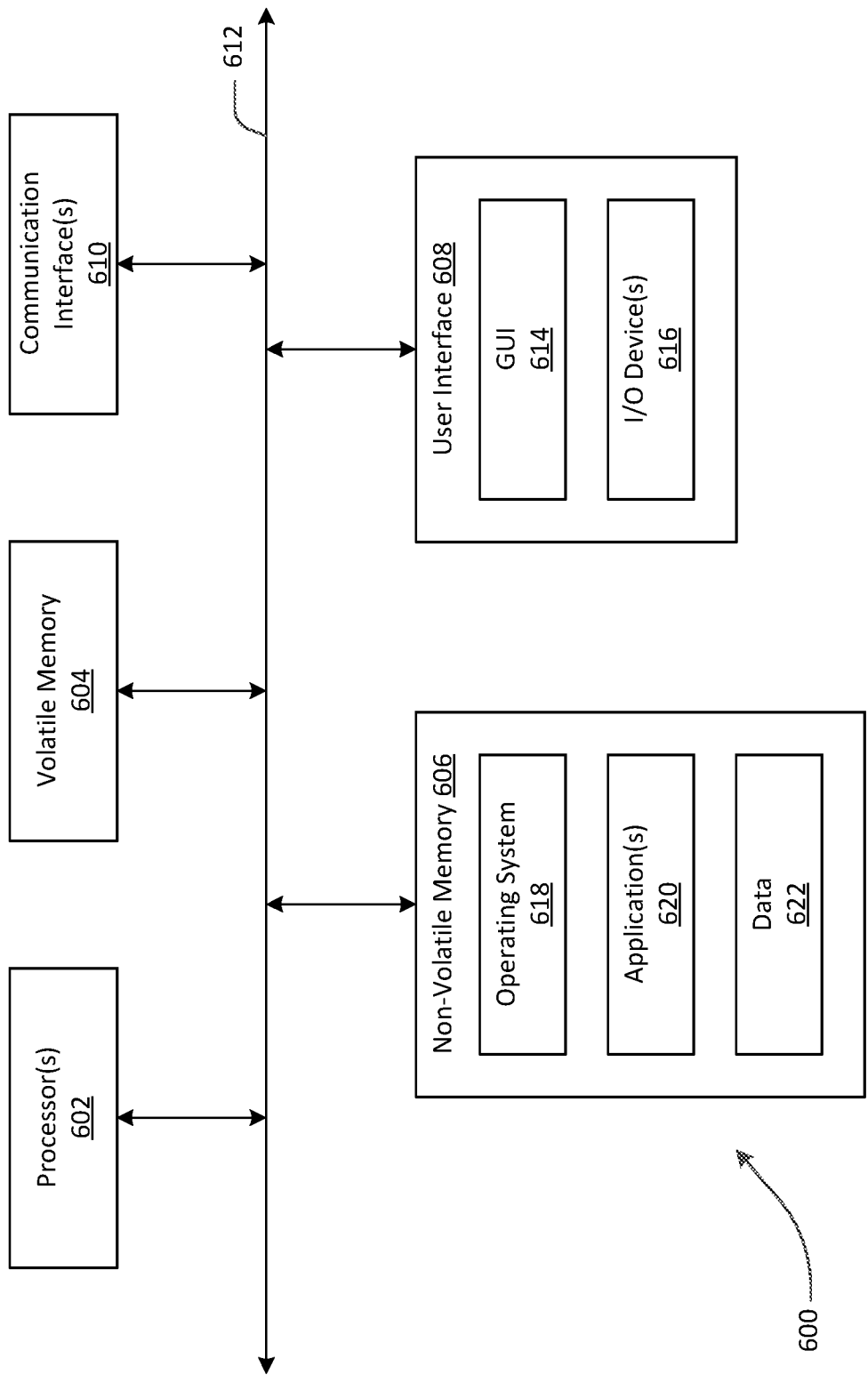
FIG. 6 is a block diagram illustrating selective components of an example computing device in which various aspects of the disclosure may be implemented, in accordance with an embodiment of the present disclosure.

Array management system 132 may include a computing device, such as computing device 600 of FIG. 6. Array management system 132 may be used by a system administrator to re-configure storage array 110, e.g., when degraded performance of storage array 110 is detected.

Network management system 134 may include a computing device, such as computing device 600 of FIG. 6. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
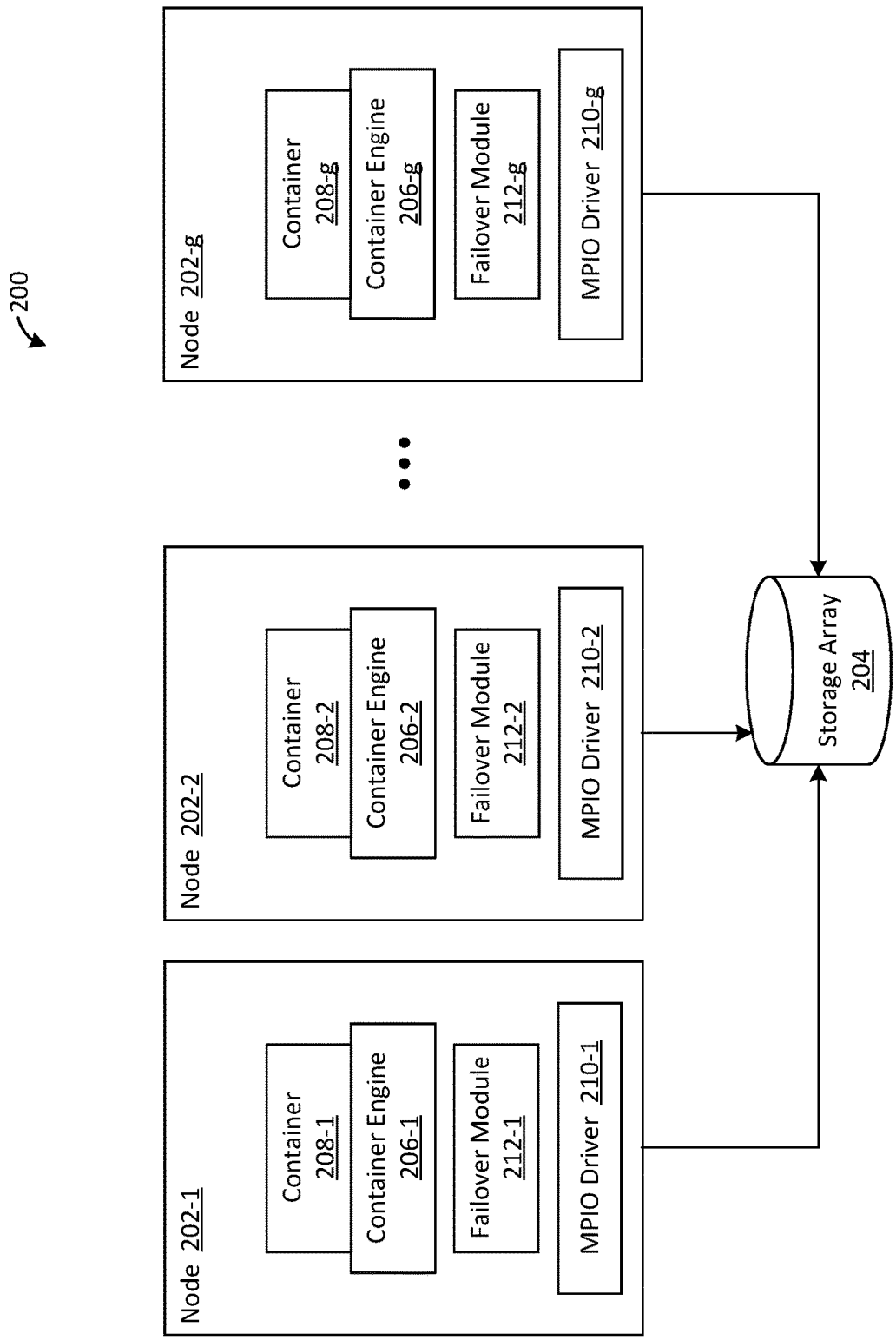
FIG. 2 is a block diagram of an illustrative a multi-node active-passive high availability (HA) cluster environment in which various embodiments of the concepts described herein may be implemented.

Referring now to FIG. 2, shown is a block diagram of an illustrative a multi-node active-passive high availability (HA) cluster environment 200 in which various embodiments of the concepts described herein may be implemented. As shown, illustrative environment 200 includes a plurality of nodes 202-1, 202-2, . . . , 202-g communicably coupled to a storage array 204 via a network (not shown). The communication network can include, for example, the Internet, LANs, WANs, FC networks, etc. In some embodiments, nodes 202 may correspond to nodes (e.g., servers) of a storage system. For example, storage array 204 may be the same or similar to any of storage arrays 110, 136 of FIG. 1. Nodes 202 may correspond to any node within storage system 100 of FIG. 1, such as host devices 130 and management systems 132, 134. However, disclosed structures and techniques are not limited to storage systems or any other particular type of systems and may be broadly applicable to any systems that provide active-passive HA configuration.

In the example of FIG. 2, nodes 202 may be organized as a cluster and provide active-passive HA. In such active-passive HA configuration, nodes 202 share the same data directory, e.g., storage array 204, and one of nodes 202 (e.g., node 202-1) operate as an "active" node and the other remaining nodes 202 (e.g., nodes 202-2, . . . , 202-g) operate as "passive" nodes. In some implementations, each node 202 may be deployed on physically separate hardware platforms, although numerous other implementations are possible. In a virtualization infrastructure, each node 202 may run on a virtual machine that is hosted by a different physical host.

In the following paragraphs, further details may be described with reference to node 202-1, but each of the other nodes (e.g., nodes 202-2 to 202-g) in environment 200 may be similarly configured. As shown, node 202-1 includes a container engine 206-1, a container 208-1, an MPIO driver 210-1, and a failover module 212-1.

Container engine 206-1 is operable to run and manage containers, such as, for example, container 208-1. Container engine 206-1 may be any of a variety of container engine products, such as, for example, a Docker engine provided by Docker, Inc. For example, in one implementation, container engine 206-1 may be installed in an operating system of node 202-1, and executable by a CPU to run and manage container 208-1. Container 208-1 may be a run time instance of a container image, such as a Docker container image, which contains appropriate code, runtime, system tools, system libraries, and system settings to execute an application. Thus, in certain implementations, container-208-1 can be understood as a containerized application. To promote clarity in the drawings, FIG. 2 shows a single container 208-1 being executed by container engine 206-1. However, it will be appreciated that container engine 206-1 may execute multiple containers 208-1.

MPIO driver 210-1 of node 202-1 is operable to control delivery of I/O operations from node 202-1 to storage array 204 via selected communication paths. MPIO driver 210-1 may be configured to select I/O operations from any of the I/O queues of node 202-1. The sources of the I/O operations stored in the I/O queues may include respective processes of one or more applications, such a containerized application running within container 208-1, on node 202-1. In some embodiments, MPIO driver 210-1 may correspond to MPIO driver 142 of FIG. 1.

Failover module 212-1 is operable to execute a container failover policy that implements error-based prediction to restart or failover a container (i.e., restart or failover a failed container). The error-based prediction allows for intelligent restart or failover decisions for container 208-1 on node 202-1. According to some embodiments described herein, failover module 212-1 may be triggered to execute upon failure of container 208-1 on node 202-1.

In embodiments, failover module 212-1 can utilize an error dictionary, which contains information about known errors associated with past container failures, to determine whether to restart container 208-1 on node 202-1 or failover to a passive node (e.g., failover to one of secondary nodes 202-2, . . . , 202-g) in case of failure of container 208-1 on node 202-1. For example, in one implementation, the error dictionary can be stored (e.g., recorded) within a data store, where it can subsequently be retrieved and used. In some embodiments, the data store may include an object database in which the error dictionary is stored, for example. The object database can be provided as any type of database (e.g., a document-oriented database) that represents data or information in the form of objects, such as, for example, error objects 300 further described below at least with respect to FIG. 3.

In operation, according to some embodiments, failover module 212-1 can determine whether to restart container 208-1 on node 202-1 based on past successful restarts of containers on node 202-1. For example, if the amount or rate of past successful restarts of containers on node 202-1 exceeds a predetermined failover decider threshold, failover module 212-1 can decide to restart container 208-1 on node 202-1. In some implementations, the predetermined failover decider threshold may be a value between 0 and 1. The predetermined failover decider threshold may be configured as part of the container failover policy.

In some embodiments, failover module 212-1 may also consider the number of past container failures on node 202-1 in determining whether to restart container 208-1 on node 202-1. For example, if the number of past container failures on node 202-1 exceeds a predetermined failure count threshold N (e.g., N=100), failover module 212-1 can decide to failover container 208-1 without attempting to restart container 208-1 on node 202-1. The value of N (i.e., the predetermined failure count threshold value) may be configured as part of the container failover policy.

In some embodiments, failover module 212-1 can include or implement an RL-based model configured to intelligently determine (or "decide") whether to restart or failover a container (e.g., failed container 208-1). An agent (i.e., an RL agent) can learn from its environment (e.g., the environment in which the agent operates) by trial and error using feedback from its own actions and experiences. RL uses rewards and penalties (or "punishments") as feedback signals for positive and negative behavior. The feedback helps the agent determine which action to take next. In some embodiments, for a particular error associated with a container failure, the agent is given a reward for each successful restart of the container and a penalty for each unsuccessful restart of the container for that error. Upon a failure of a container with a particular error, the agent can determine whether to restart or failover the container based on its learning. In some embodiments, the agent may also apply epsilon-greedy logic for random exploration and exploitation.

Further description of the RL-based model and other processing that can be implemented within failover module 212-1 is provided below with respect to FIG. 5.

FIG. 3 shows an example error object 300, in accordance with an embodiment of the present disclosure. As mentioned previously, a container on a node may fail due to an error (e.g., exit with an error code). Error object 300 can represent an error associated with a container failure. In some embodiments, error object 300 may be a record in the error dictionary which contains information about known errors associated with past container failures. In some implementations, if a failover module (e.g., failover module 212 of FIG. 2) on a node determines that an error code associated with a container failure on the node is a new error (e.g., the error code returned with the container failure has not been previously recorded as a known error), the failover module may create an error object 300 that represents the error and add the created error object 300 to the error dictionary. For example, the failover module on a node can determine whether an error associated with a container failure is a new error by checking the error dictionary for an error object (e.g., error object 300) that represents the error associated with the container failure on the node. As shown, error object 300 can include an error_code attribute and an error_code_value attribute.

The error_code attribute can be a numeric or alphanumeric code that indicates an error associated with a container failure on a node. By way of an example, error_code 500 may indicate an internal server error (e.g., the server encountered an unexpected condition that prevented it from fulfilling the request). As another example, error_code 400 may indicate a client error (e.g., the server cannot process the request due to a perceived client error). The error_code_value attribute can indicate a value assigned to the error_code. In some embodiments, the error_code_value attribute may be rewarded or penalized based on whether a restart of a container that failed with the error_code is successful or unsuccessful. Thus, the error_code_value attribute can be understood as a score (e.g., a successful restart score) reflective of the amount or rate of successful restarts of containers and failures of containers, including unsuccessful restarts of containers, with the error_code. In one implementation, the error_code_value may be a value between 0 and 1.

FIG. 4 shows several attributes of an example container failover policy 400, in accordance with an embodiment of the present disclosure. Container failover policy 400 can specify how a container failover manager (e.g., failover module 212 of FIG. 2) is to respond when a container, such as an application container, fails on a node. The illustrated attributes may be used by the container failover manager in applying container failover policy 400. As shown, the illustrated attributes may include an initial_value_to_error_code attribute, a failover_threshold attribute, a failcount_threshold attribute, and a failcount attribute. The values for the initial_value_to_error_code attribute, failover_threshold attribute, and failcount_threshold attribute may be predetermined (e.g., configured by the organization as part of container failover policy 400). The list of attributes shown in FIG. 4 is merely illustrative and is not intended to depict a complete list of attributes which can be included in or are a part of container failover policy 400.

The initial_value_to_error_code attribute can indicate an initial value to assign to an error_code_value of an error object (e.g., error object 300 of FIG. 3) representing an error when the error object is first created and added to the error dictionary. The initial_value_to_error_code may be a value that is between 0 and 1, such as, for example, 0.10, 0.15, 0.20, or any other suitable value.

The failover_threshold attribute can indicate a failover decider threshold for the error_code_value below which restarts of container failures with the error_code are not attempted. That is, when the error_code_value is smaller than the failover_threshold value, restarts of containers that failed with the error_code are not restarted but, rather, failover is performed for such containers. In some embodiments, the failover_threshold attribute and the error_code_value attribute may be used to decide to failover a container that failed with the error_code without attempting a restart of the container.

The failcount attribute indicates a count of the number of times a container failed on the node. The failcount_threshold attribute can indicate a failure count threshold for the count of the number of container failures on the node until which restarts of container is attempted. That is, failures of containers on the node beyond the failcount_threshold value are not restarted but, rather, failover is performed for such containers. In some embodiments, the failcount attribute and the failcount_threshold attribute may be used to decide to failover a container that failed on the node without attempting a restart of the container. For example, when failcount reaches failcount_threshold, the container will be failed over to another node and the failcount value will be set back to 0.

Figure 5:
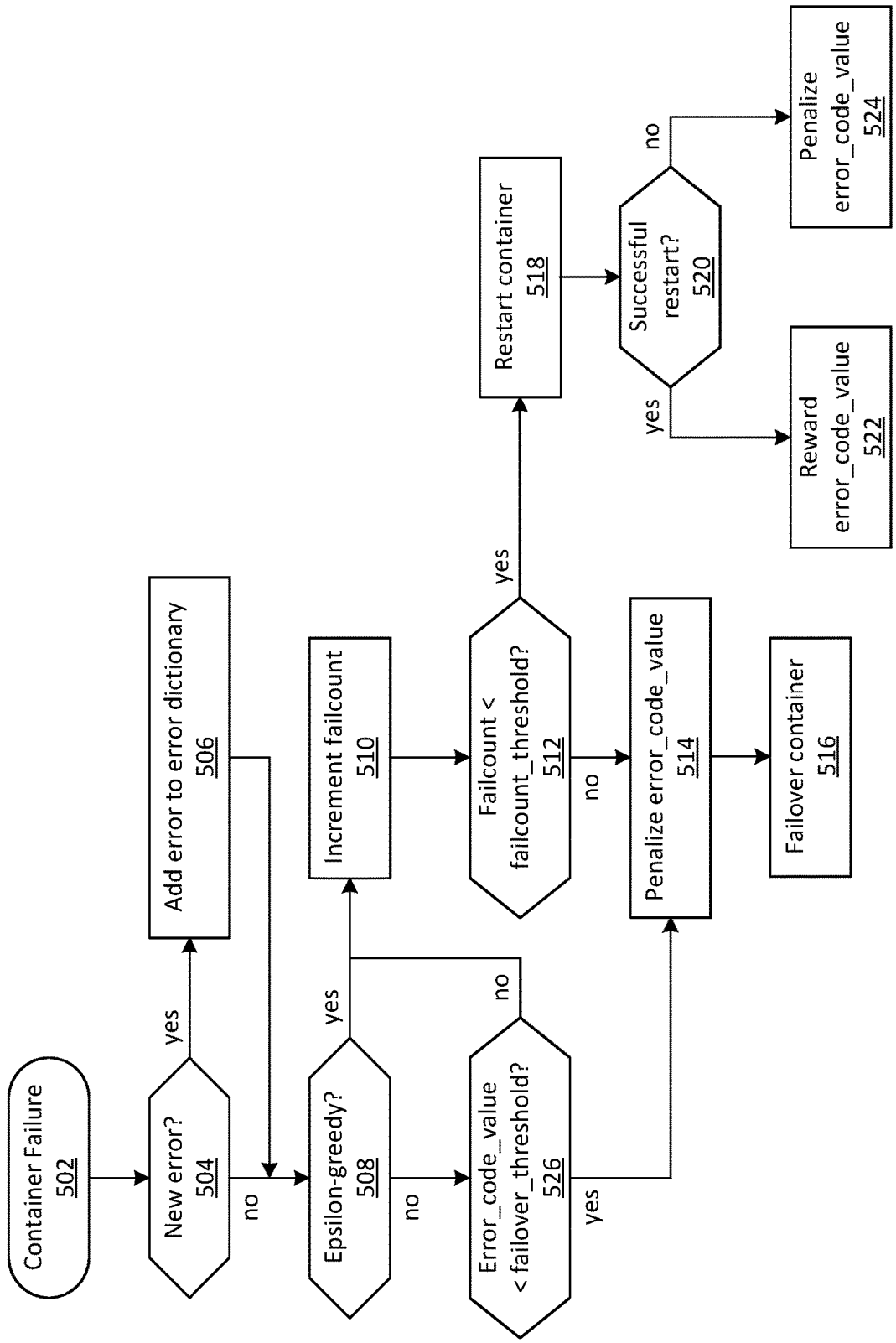
FIG. 5 is a flow diagram of an example process for intelligent restart or failover of a container, in accordance with an embodiment of the present disclosure.

FIG. 5 is a flow diagram of an example process 500 for intelligent restart or failover of a container, in accordance with an embodiment of the present disclosure. Illustrative process 500 may be implemented, for example, within failover module 212 of FIG. 2 and execute upon a failure of a container on a node (e.g., upon failure of container 208 on node 202).

With reference to process 500 of FIG. 5, at 502, a container on a node may fail with an error. For purposes of this discussion, the failed container may be container 208-1 on active node 202-1.

At 504, a check may be performed to determine whether the error is a new error. In other words, a check may be performed to determine whether the error is a known error. For example, failover module 212-1 may check an error dictionary which contains information about known errors associated with past container failures to determine whether the error associated with the failure of container 208-1 on node 202-1 is a new error. If it is determined that the error is a new error, then, at 506, the error may be added (or "recorded") to the error dictionary as a known error. For example, failover module 212-1 can record the error to the error dictionary by creating an error object (e.g., error object 300) that represents the error and adding the error object to the error dictionary. Failover module 212-1 can set the value of error_code to the error code of the error and initialize the value of the error_code_value attribute to the initial_value_to_error_code attribute value in the created error object. As explained above, the initial_value_to_error_code attribute value may be specified in the container failover policy (e.g., container failover policy 400 of FIG. 4).

Otherwise, if, at 504, a determination is made that the error is not a new error or subsequent to adding the error to the error dictionary as a known error at operation 506, a check may be performed to determine whether an epsilon-greedy condition is satisfied at 508. Epsilon-greedy is an approach to balance exploration and exploitation by choosing between exploration and exploitation randomly. Exploration is to choose a random option, for example, restart or failover, with probability epsilon. Exploration allows an agent to improve its current knowledge about each action (e.g., restart or failover), which may lead to long-term benefits. Exploitation is to choose the best option based on prior learning (e.g., prior knowledge of the environment) the remainder of the time. In some implementations, the value of epsilon may be set to 9%, 10%, 11%, or another suitable value. For example, if the value of epsilon is set to 10%, exploration is performed 10% of the time and exploitation is performed the remaining 90% of the time.

If, at 508, the epsilon-greedy condition is satisfied, then, at 510, the count of the container failures on the node may be incremented. For example, failover module 202-1 can increment the failcount attribute to reflect the current failure of container 208-1 on node 202-1. For example, suppose the current value of the failcount attribute in the container failover policy is 2. In this example, failover module 202-1 may increment the value of the failcount attribute to 3 to accurately record the number of times a container failed on node 202-1.

At 512, a check may be performed to determine whether the count of the container failures on the node is less than the failcount_threshold. For example, failover module 202-1 can determine whether the failcount attribute is less than the failcount_threshold. The check here is to determine whether the number of past container failures on the node is such that a restart of the container that failed is not to be attempted.

If, at 512, it is determined that the count of the container failures on the node is not less than the failcount_threshold, then, at 514, the error_code_value for the error may be penalized. For example, failover module 202-1 can reduce (penalize) the value of the error_code_value attribute in the error object representing the error by a predetermined value P (e.g., P=0.02). In this case, the error_code_value attribute is being adjusted to reflect the current failure of container 208-1 on node 202-1. In one implementation, the penalty, P, may be a value between 0 and 1. The value of P may be configured as part of the container failover policy.

At 516, failover of the container may be performed. For example, failover module 212-1 on node 202-1 can perform a failover of container 208-1 to a passive node (e.g., failover container 208-1 to one of secondary nodes 202-2, . . . , 202-g). The count of the container failures on the node can then be reinitialized. For example, failover_module 212-1 on node 202-1 can initialize the value of the failcount attribute to back to 0.

Otherwise, if, at 512, it is determined that the count of the container failures on the node is less than the failcount_threshold, then, at 518, a restart of the container may be attempted on the same node. For example, failover module 212-1 can attempt a restart of container 208-1 on node 202-1. Failover module 212-1 can monitor container 208-1 for a successful restart or a failure (e.g., an exit with an error code).

At 520, a check may be performed to determine whether the container successfully restarts. For example, failover module 212-1 can check to determine whether the restart of container 208-1 on node 202-1 attempted at 518 is successful (e.g., check to determine whether container 208-1 successfully restarted on node 202-1). If it is determined that the container is successfully restarted, then, at 522, the error_code_value for the error may be rewarded. For example, failover module 212-1 can increase (reward) the value of the error_code_value attribute in the error object representing the error by a predetermined value R (e.g., R=0.02). In this case, the error_code_value attribute is being adjusted to reflect the successful restart of container 208-1 on node 202-1. In one implementation, the reward, R, may be a value between 0 and 1. The value of R may be configured as part of the container failover policy.

Otherwise, of, at 520, it is determined that the container is not successfully restarted (e.g., attempted restart of the container exits with an error code), then, at 524, the error_code_value for the error may be penalized. For example, failover module 212-1 can reduce (penalize) the value of the error_code_value attribute in the error object representing the error by the value P. In this case, the error_code_value attribute is being adjusted to reflect the unsuccessful restart of container 208-1 on node 202-1. That is, the error_code_value is being reduced as a penalty for the unsuccessful restart of the container for the error. In some embodiments, failover module 212-1 may return to 502 and perform process 500 for the error associated with the most recent failure of container 208-1 on node 202-1 (i.e., the error associated with the unsuccessful restart of container 208-1 determined at operation 520).

If, at 508, the epsilon-greedy condition is not satisfied, then, at 526, a check may be performed to determine whether the error_code_value for the error is less than the failover_threshold. For example, failover module 212-1 can determine whether the error_code_value attribute in the error object representing the error is less than the failover_threshold. The check here is to determine whether a restart of a container should be attempted based on the successful restart score (i.e., the amount or rate of successful restarts of containers and failures of containers, including unsuccessful restarts of containers, with the error) and the failover_threshold.

If, at 526, it is determined that the error_code_value for the error is less than the failover_threshold, then, at 514, the error_code_value for the error may be penalized. At 516, failover of the container may be performed. For example, failover module 212-1 on node 202-1 can perform a failover of container 208-1 to a passive node (e.g., failover container 208-1 to one of secondary nodes 202-2, . . . , 202-g). The count of the container failures on the node can then be reinitialized. For example, failover_module 212-1 on node 202-1 can initialize the value of the failcount attribute to back to 0.

Otherwise, if, at 526, it is determined that the error_code_value for the error is not less than the failover_threshold, then, at 510, the count of the container failures on the node may be incremented. The processing of process 500 may then continue from operation 510 as described above.

FIG. 6 is a block diagram illustrating selective components of an example computing device 600 in which various aspects of the disclosure may be implemented, in accordance with an embodiment of the present disclosure. For example, illustrative computing device 600 can perform all or part of the processes described herein. As shown, computing device 600 includes one or more processors 602, a volatile memory 604 (e.g., random access memory (RAM)), a non-volatile memory 606, a user interface (UI) 608, one or more communications interfaces 610, and a communications bus 612.

Non-volatile memory 606 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 608 may include a graphical user interface (GUI) 614 (e.g., a touchscreen, a display, etc.) and one or more input/output (I/O) devices 616 (e.g., a mouse, a keyboard, a microphone, one or more speakers, one or more cameras, one or more biometric scanners, one or more environmental sensors, and one or more accelerometers, etc.).

Non-volatile memory 606 stores an operating system 618, one or more applications 620, and data 622 such that, for example, computer instructions of operating system 618 and/or applications 620 are executed by processor(s) 602 out of volatile memory 604. In one example, computer instructions of operating system 618 and/or applications 620 are executed by processor(s) 602 out of volatile memory 604 to perform all or part of the processes described herein (e.g., processes illustrated and described with reference to FIGS. 1 through 4). In some embodiments, volatile memory 604 may include one or more types of RAM and/or a cache memory that may offer a faster response time than a main memory. Data may be entered using an input device of GUI 614 or received from I/O device(s) 616. Various elements of computing device 600 may communicate via communications bus 612.

The illustrated computing device 600 is shown merely as an illustrative client device or server and may be implemented by any computing or processing environment with any type of machine or set of machines that may have suitable hardware and/or software capable of operating as described herein.

Processor(s) 602 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 602 may be analog, digital, or mixed signal. In some embodiments, processor 602 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 610 may include one or more interfaces to enable computing device 600 to access a computer network such as a Local Area Network (LAN), a Wide Area Network (WAN), a Personal Area Network (PAN), or the Internet through a variety of wired and/or wireless connections, including cellular connections.

In described embodiments, computing device 600 may execute an application on behalf of a user of a client device. For example, computing device 600 may execute one or more virtual machines managed by a hypervisor. Each virtual machine may provide an execution session within which applications execute on behalf of a user or a client device, such as a hosted desktop session. Computing device 600 may also execute a terminal services session to provide a hosted desktop environment. Computing device 600 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   determining, by a node of an active-passive high availability (HA) cluster, that a container on the node has failed with an error;
   responsive to a determination that the error is a new error:
      creating, by the node, an error object that represents the error, wherein the error object comprises an error_code attribute that indicates the error and an error_code_value attribute that indicates a value assigned to the error_code; and
      initializing, by the node, the value of the error_code_value attribute to a value of an initial_value_to_error_code attribute, wherein the initial_value_to_error_code attribute indicates an initial value to assign to the error_code_value;
   incrementing, by the node, a failcount attribute that indicates a count of a number of container failures on the node;
   determining, by the node, whether to restart or failover the container based on a comparison of the failcount attribute and a failcount_threshold attribute, wherein the failcount_threshold attribute indicates a failure count threshold for the failcount; and
   responsive to a determination to restart the container, attempting, by the node, a restart of the container on the node.

2. The method of claim 1, further comprising, responsive to a determination that the restart of the container is successful, rewarding, by the node, the error_code_value attribute.

3. The method of claim 1, further comprising, responsive to a determination that the restart of the container is not successful, penalizing, by the node, the error_code_value attribute.

4. The method of claim 1, further comprising, responsive to a determination to failover the container, by the node:
   penalizing the error_code_value attribute; and
   performing a failover of the container to a passive node of the active-passive HA cluster.

5. The method of claim 1, wherein the determining whether to restart or failover the container is further based on a comparison of the error_code_value attribute and a failover_threshold attribute, wherein the failover_threshold attribute indicates a failover decider threshold for the error_code_value.

6. The method of claim 5, wherein the comparison of the error_code_value attribute and the failover_threshold attribute is performed before the comparison of the failcount attribute and the failcount_threshold attribute.

7. The method of claim 1, wherein the determining whether to restart or failover the container is further based on a check of an epsilon-greedy condition.

8. The method of claim 7, further comprising, responsive to a determination that the epsilon-greedy condition is satisfied, attempting, by the node, a restart of the container on the node based on the comparison of the failcount attribute and the failcount_threshold attribute.

9. The method of claim 7, further comprising, responsive to a determination that the epsilon-greedy condition is not satisfied, performing, by the node, a failover of the container to a passive node of the active-passive HA cluster based on a comparison of the error_code_value attribute and a failover_threshold attribute, wherein the failover_threshold attribute indicates a failover decider threshold for the error_code_value.

10. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
determining, by a node of an active-passive high availability (HA) cluster, that a container on the node has failed with an error;
responsive to a determination that the error is a new error:
creating, by the node, an error object that represents the error, wherein the error object comprises an error_code attribute that indicates the error and an error_code_value attribute that indicates a value assigned to the error_code; and
initializing, by the node, the value of the error_code_value attribute to a value of an initial_value_to_error_code attribute, wherein the initial_value_to_error_code attribute indicates an initial value to assign to the error_code_value;
incrementing, by the node, a failcount attribute that indicates a count of a number of container failures on the node;
determining, by the node, whether to restart or failover the container based on a comparison of the failcount attribute and a failcount_threshold attribute, wherein the failcount_threshold attribute indicates a failure count threshold for the failcount; and
responsive to a determination to restart the container, attempting, by the node, a restart of the container on the node.

11. The system of claim 10, wherein the process further comprises, responsive to a determination that the restart of the container is successful, rewarding, by the node, the error_code_value attribute.

12. The system of claim 10, wherein the process further comprises, responsive to a determination that the restart of the container is not successful, penalizing, by the node, the error_code_value attribute.

13. The system of claim 10, wherein the process further comprises, responsive to a determination to failover the container, by the node:
penalizing the error_code_value attribute; and
performing a failover of the container to a passive node of the active-passive HA cluster.

14. The system of claim 10, wherein the determining whether to restart or failover the container is further based on a comparison of the error_code_value attribute and a failover_threshold attribute, wherein the failover_threshold attribute indicates a failover decider threshold for the error_code_value.

15. The system of claim 10, wherein the determining whether to restart or failover the container is further based on a check of an epsilon-greedy condition.

16. The system of claim 15, wherein the process further comprises, responsive to a determination that the epsilon-greedy condition is satisfied, attempting, by the node, a restart of the container on the node based on the comparison of the failcount attribute and the failcount_threshold attribute.

17. The system of claim 15, wherein the process further comprises, responsive to a determination that the epsilon-greedy condition is not satisfied, performing, by the node, a failover of the container to a passive node of the active-passive HA cluster based on a comparison of the error_code_ value attribute and a failover_threshold attribute, wherein the failover_threshold attribute indicates a failover decider threshold for the error_code_value.

18. A non-transitory machine-readable medium encoding instructions that when executed by one or more processors cause a process to be carried out, the process including:
determining, by a node of an active-passive high availability (HA) cluster, that a container on the node has failed with an error;
responsive to a determination that the error is a new error:
creating, by the node, an error object that represents the error, wherein the error object comprises an error_code attribute that indicates the error and an error_code_value attribute that indicates a value assigned to the error_code; and
initializing, by the node, the value of the error_code_value attribute to a value of an initial_value_to_error_code attribute, wherein the initial_value_to_error_code attribute indicates an initial value to assign to the error_code_value;
incrementing, by the node, a failcount attribute that indicates a count of a number of container failures on the node;
determining, by the node, whether to restart or failover the container based on a comparison of the failcount attribute and a failcount_threshold attribute, wherein the failcount_threshold attribute indicates a failure count threshold for the failcount;
responsive to a determination to restart the container, attempting, by the node, a restart of the container on the node; and
responsive to a determination to failover the container, by the node:
penalizing the error_code_value attribute; and
performing a failover of the container to a passive node of the active-passive HA cluster.

19. The non-transitory machine-readable medium of claim 18, wherein the process further comprises, responsive to a determination that the restart of the container is successful, rewarding, by the node, the error_code_value attribute.

20. The non-transitory machine-readable medium of claim 18, wherein the process further comprises, responsive to a determination that the restart of the container is not successful, penalizing, by the node, the error_code_value attribute.

* * * * *